UNITED STATES PATENT OFFICE.

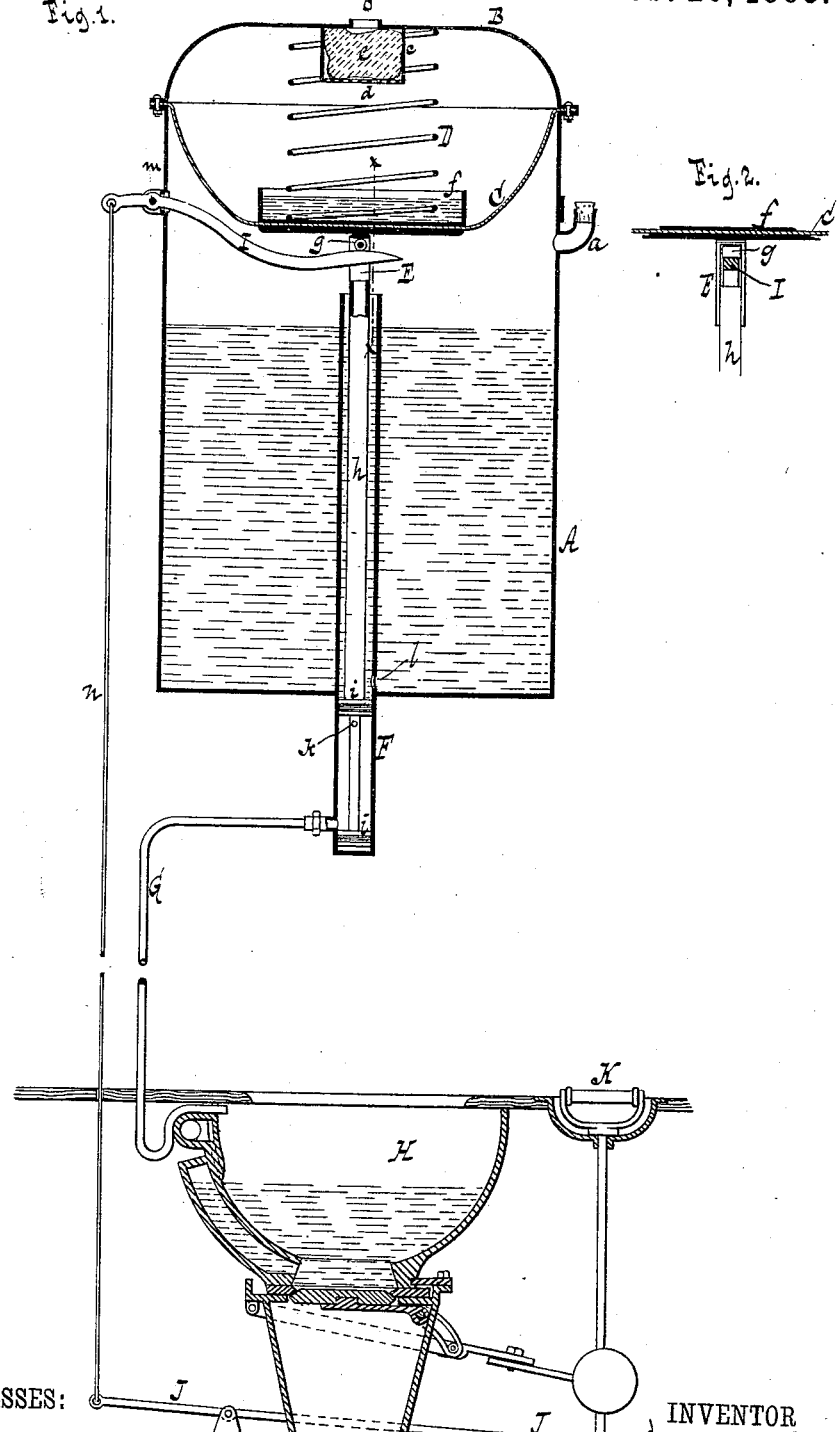

SAMUEL W. PARKER AND HENRY BLACKMAN, OF NEW YORK, N. Y.

DISINFECTING APPARATUS FOR WATER-CLOSETS.

SPECIFICATION forming part of Letters Patent No. 272,758, dated February 20, 1883.

Application filed November 2, 1882. (No model.)

*To all whom it may concern:*

Be it known that we, SAMUEL W. PARKER and HENRY BLACKMAN, both citizens of the United States, residing at New York, in the county and State of New York, have invented new and useful Improvements in Disinfecting Apparatus for Water-Closets, of which the following is a specification.

This invention relates to an apparatus which serves to conduct a measured quantity of a suitable disinfecting-liquid into the bowl of a water-closet or urinal whenever a lever provided for this purpose is actuated, either by pulling a handle or by stepping thereon, and which also forces a quantity of air saturated with a disinfectant into the room containing the water-closet or urinal.

The peculiar construction of our apparatus is pointed out in the following specification, and illustrated in the accompanying drawings, in which—

Figure 1 represents a vertical central section. Fig. 2 is a section in the plane $xx$, Fig. 1.

Similar letters indicate corresponding parts.

In the drawings, the letter A designates a vessel which contains the disinfecting-liquid. This vessel is by preference made of glass, so that the level of the liquid contained therein may be observed at all times; but it may also be made of sheet metal and provided with a strip of glass inserted into its side for the purpose of observing the level of the liquid. A spout, $a$, serves to introduce the disinfecting-liquid. Said vessel is provided with a cover, B, and between this cover and the body of the vessel is secured a flexible diaphragm, C, which is exposed to the action of a spring, D, that has a tendency to keep the same depressed to the position shown in the drawings.

In the top of the cover B is an air-escape opening, $b$, and on the inner surface of said cover, beneath the air-escape opening, is secured a compartment, $c$, with a perforated bottom, $d$, said compartment being intended to contain a sponge, $e$.

On the diaphragm C is firmly secured a flat tray, $f$, which contains a suitable disinfectant.

On the bottom of the diaphragm, opposite to the tray $f$, is fastened a cage, E, Fig. 2, which contains a roller, $g$, and from which extends a pipe, $h$. On the lower portion of this pipe are secured two pistons, $i\ i'$, which work in a tube, F, which is fastened in the bottom of the vessel A. Between the pistons $i\ i'$ is an opening, $k$, in the pipe $h$, which forms a vent, as will be presently explained.

In the tube F, close above the bottom of the vessel A, is an opening, $l$, and from said tube, near its lower end, extends a pipe, G, into the bowl H of a water-closet or urinal.

I is a lever, which has its fulcrum on a pivot, $m$, fastened in a bracket attached to the side of the vessel A. The inner end of this lever extends through the cage E and bears against the roller $g$, and its outer end connects by a rod, $n$, with a lever, J. In the example shown in the drawings this lever connects with the handle K of the water-closet; but it can be so arranged that by stepping on it the rod $n$ is drawn downward.

Whenever the lever J is actuated so as to draw the rod $n$ downward, the lever I forces the diaphragm C up, and the air contained in the chamber above the diaphragm is forced out into the room through the sponge $e$ in the compartment $c$, and if this sponge has been charged with a suitable disinfectant the air, in passing through said sponge, becomes charged with such disinfectant, so as to disinfect the air in the room. As the diaphragm is forced clear up by the lever I the sponge-compartment $c$ is caused to dip into the disinfectant contained in the tray $f$, and the sponge becomes saturated with such disinfectant, so that when the diaphragm recedes the air which is drawn in through the opening $b$ and passes through said sponge becomes charged with the disinfectant. As the diaphragm rises the pistons $i\ i'$ move up in the tube F, and as soon as the piston $i$ has passed the opening $l$ a portion of the disinfecting-liquid runs down into the tube F and fills the space between the two pistons, the air previously occupying this space being free to escape through the vent $k$. At the same time a portion of the liquid contained in the upper portion of the tube F flows over into the vessel A. When the diaphragm recedes, being forced down by the spring D, the pipe $h$ descends, and when the pistons $i\ i'$ have reached the position shown in Fig. 1 the disinfecting-liquid contained in the space between said pistons flows down into the bowl H through the pipe G.

In practice the piston $i$ will be made adjustable on the pipe $h$, so that the space between the two pistons $i$ $i'$ can be increased or diminished, according to the quantity of disinfecting-liquid which it is desired to inject into the bowl H for each stroke of the diaphragm C or of the lever I.

It will be seen from this description that the tube F, together with the pistons $i$ $i'$, forms a pump with a tubular piston-rod, $h$, to which motion is imparted by means of the actuating-lever J. It is obvious that the construction of the pump can be modified without departing from our invention.

What we claim as new, and desire to secure by Letters Patent, is—

1. The combination of the vessel A, the tube F, having an opening, $l$, and secured to the bottom of the vessel, and the pipe $h$, provided with an air-vent, $k$, and pistons $i$ $i'$, which operate in the tube, with the disinfectant-supply pipe G, the actuating-lever J, the rod $n$, and the lever I, which acts upon the pipe $h$, substantially as described.

2. The combination, substantially as hereinbefore described, of the vessel A, the diaphragm C, the spring D, for depressing said diaphragm, the sponge-compartment $c$, having the air-escape opening $b$, the tray $f$, the lever I, for actuating said diaphragm, and the actuating-lever J, which connects with the lever I.

3. The combination of the vessel A, the tube F, provided with the opening $l$, the disinfectant-supply pipe G, the pipe $h$, provided with the air-vent $k$, and pistons $i$ $i'$, which operate in the tube, the diaphragm-chamber C, provided with the air-escape opening $b$, the sponge-compartment $c$, the tray $f$, the lever I, and the actuating-lever J, substantially as described.

4. The combination of the vessel A, for containing a disinfecting-liquid, the tube F, provided with an opening, $l$, and arranged in the vessel and secured to the bottom thereof, the disinfectant-supply pipe G, connected with the said tube, the pipe $h$, arranged in the tube F and provided with the pistons $i$ $i'$ and air-vent $k$, and means for operating the pipe $h$ to draw liquid from the vessel and deliver it to the disinfectant-supply pipe, substantially as described.

In testimony whereof we have hereunto set our hands in the presence of two subscribing witnesses.

SAMUEL W. PARKER.
HENRY BLACKMAN.

Witnesses:
W. HAUFF,
CHAS. WAHLERS.